United States Patent [19]
Fletcher et al.

[11] 3,769,834
[45] Nov. 6, 1973

[54] WHOLE BODY MEASUREMENT SYSTEMS

[76] Inventors: James C. Fletcher, Administrator of the National Aeronautics and Space Administration with respect to an invention by; John S. Ogle, Milpitas, Calif.

[22] Filed: Nov. 18, 1971

[21] Appl. No.: 200,040

[52] U.S. Cl. .................................. 73/149, 128/2 S
[51] Int. Cl. .............................................. G01f 17/00
[58] Field of Search ........................ 73/149, 290 B; 128/2 S, 2.05

[56] References Cited
FOREIGN PATENTS OR APPLICATIONS
1,480,470  4/1967  France ................................. 73/149
748,729   12/1944  Germany ............................. 73/149

OTHER PUBLICATIONS
Comroe et al., Journal of Applied Physiology, May 1959, Vol. 14 pp. 439–444.

*Primary Examiner*—S. Clement Swisher
*Attorney*—Russell E. Schlorff et al.

[57] ABSTRACT

A system for measuring the volume and volume variations of a human body under zero gravity conditions is disclosed. An enclosed chamber having a defined volume and arranged for receiving a human body is provided with means for infrasonically varying the volume of the chamber. The changes in volume produce resultant changes in pressure, and under substantially isentropic conditions, an isentropic relationship permits a determination of gas volume which, in turn, when related to total chamber volume permits a determination of the body volume. By comparison techniques, volume changes of a human independent of gravity conditions can be determined.

5 Claims, 1 Drawing Figure

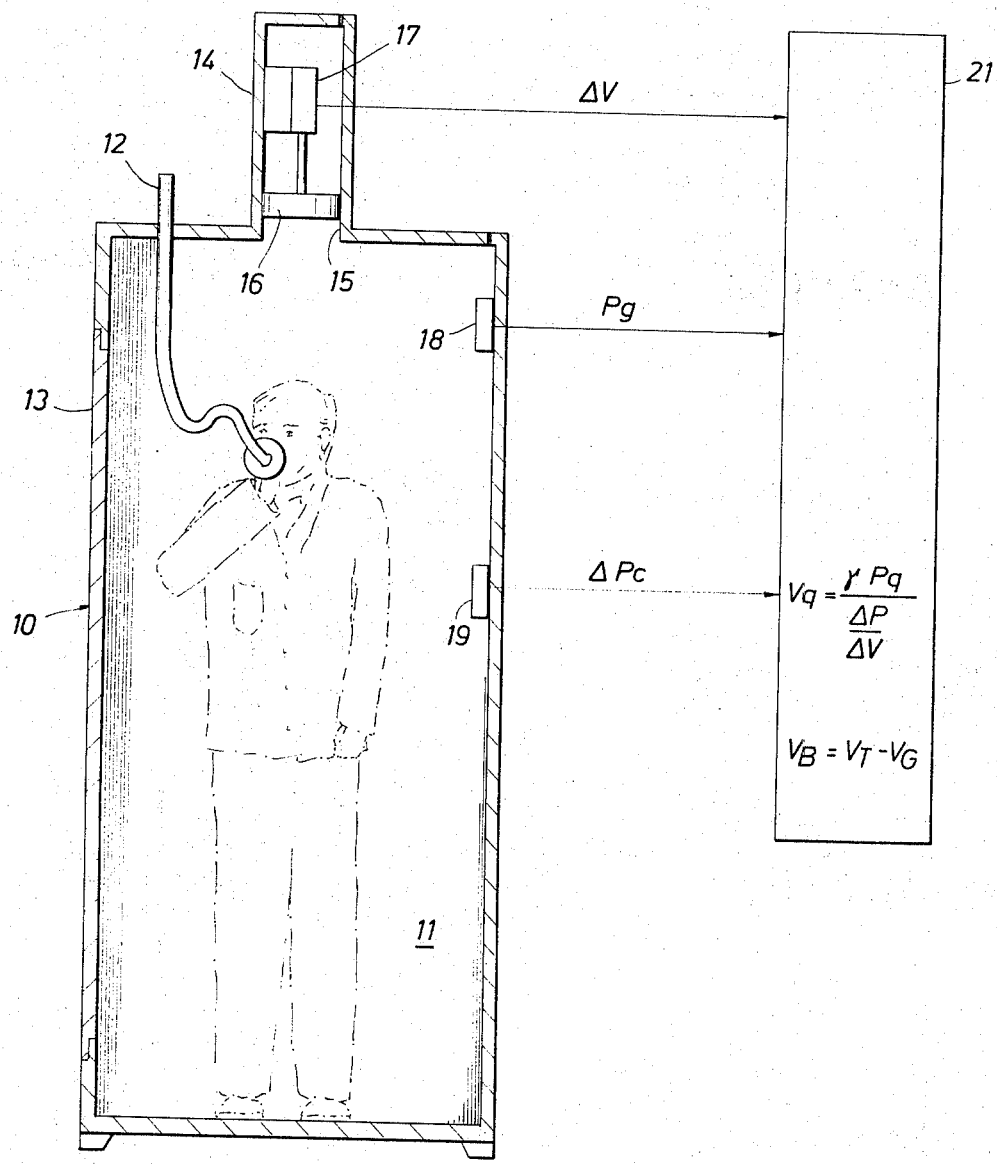

WHOLE BODY MEASUREMENT SYSTEMS

ORIGIN OF THE INVENTION

The invention described herein was made in the performance of a NASA contract and is subject to the provisions of Section 305 of the National Aeronautics and Space Act of 1958, Public Law 85–568 (73 Statute 435; 42 USC 2457).

FIELD OF THE INVENTION

This invention relates to bio-medical space systems for quantatively determining the volume and volume change of a human body under zero gravity conditions over a period of time. In particular, it relates to methods and apparatus for determining the volume of a human body by a determination of gas volume is an enclosed chamber using changes in pressure corresponding to changes in volume for determining the volume of the human body.

The problems involved in space travel and existence are considerable. Among these problems is the concern for the metabolic density of astronauts exposed to conditions of weightlessness (zero gravity) over a period of time. Determination of density raises particular problems, as ordinary techniques for measuring density are inapplicable without the influence of earth's gravity. Because of respiratory requirements of an astronaut, the solutions which might ordinarily be applicable to determination of weight fail to suffice. By means of the present invention, however, the relationship of several basic concepts is formulated to provide a simple and reliable measurement of human volume changes under space conditions.

DESCRIPTION OF PRIOR ART

There is no prior art known to applicant relative to determination of volume change of an astronaut in space. Heretofore, techniques have been proposed for determining the volume of liquid stored within a chamber under gravity conditions by determining weight and, from the weight, determining volume. Under weightlessness conditions, however, volumes of liquid have been determined through a variety of techniques, including changes in pressure between a reference volume and unknown volume, resonant frequencies, phase measurements of sound waves and so forth. None of these techniques provides any practical direction for the deterininination of human volume change in a space station, and none has suggested a solution for this problem.

SUMMARY OF THE INVENTION

The present invention involves a technique for ascertaining body volume change under less than one gravity conditions. To do this, a chamber is provided to accommodate an astronaut. Respiratory means are provided to the interior of the chamber. The volume of the chamber is precisely known. Once the astronaut is within the chamber, the volume of the chamber enclosing the astronaut is cyclically varied by a predetermined amount to induce measurable changes in pressure. The base pressure, the changes in pressure, and changes in volume are supplied to a computer which determines the body volume at that time. At any subsequent time, the body volume is redetermined so that changes in body volume may be determined.

BRIEF DESCRIPTION OF THE DRAWING

The single FIGURE is a functional illustration of the components which embody the present invention.

DESCRIPTION OF THE PREFERRED EMBODIMENT

The present invention concerns itself with a system for measuring the body volume of an essentially incompressible human body in a compressible gas media under space flight or zero gravity conditions. In the practice of the present invention, the body and gas are first enclosed in an essentially rigid container. Next, the volume of the container is varied, inducing a variation in pressure. The volume of the human body is determined by substracting the volume of gas from the total volume. The volume of the body is determined and recorded.

The principles on which the present invention is based include a determination of gas volume from cyclic variations in the enclosed container volume. With cyclic variations, the gas pressure variations as well as the absolute gas pressure permit a determination of the gas volume by use of the isentropic gas equation which is generally stated as $$P = \left(\frac{M}{V}\right)^{\gamma} = (M/V)^{1.4} \quad (1)$$

where P = air pressure, V = air volume, M = mass of enclosed air, and $\gamma$ = the ratio of specific heat at constant pressure to the specific heat at constant volume ($\gamma$ = 1.4 for air). With small volume variations, an approximation as follows can be made where air is the gas:

$$dP/dV = (-1.4/V)(M/V)^{1.4} = (-1.4P/V) \quad (2)$$

or $$Vg = \frac{\gamma P g}{\frac{\Delta P g}{\Delta V g}} \quad (3)$$

where $V_g$ is the volume of the gas, $\gamma$ is the ratio of the specific heat of the gas at constant pressure to the specific heat at constant volume, $P_g$ is the measured pressure of the gas, ($\Delta P_g/\Delta V_g$) is the ratio of pressure variation as measured to volume variation as generated. Because infrasonics having long wavelengths are not effectively attenuated by ordinary acoustic absorbers and cannot be perceived by humans at low levels of intensities, they are ideally suitable for this application. Thus, the frequency of cyclic variation is preferably between 1 and 100 Hertz. Such infrasonics can be readily picked up by low frequency responsive microphones and converted into electrical signals. Thus, the volume of air in a rigid enclosure, which may or may not contain the subject, can be determined by measuring the pressure, and the pressure variations which must have a frequency high enough to have a short period relative to the time constant of any leaks for the system.

The volume of the body may be approximately determined from the voltage of a transducer by calibrating the voltage output of a transducer to the body volume.

This is determined by obtaining a voltage output for different known volumes in the enclosure.

For examble, in a laboratory model, a cylindrical container of 63.5 cm. I.D. and 138.43 cm. in length was provided with a 20.3 cm. diameter back-loaded speaker to generate the volume changes. 19 foam plastic blocks of approximately 4.3 liters average volume were inserted into the enclosure. The total volume of the blocks was 81.75 liters. Calibration was accomplished by sequentially removing and replacing the blocks. The pressure was sensed by a crystal microphone with a source follower circuit. The output voltage of the microphone as determined from a voltmeter varied as follows for the first seven blocks:

| Total Block Volume (liters) | Output Voltage (volts) | Calculated Volume (liters) |
|---|---|---|
| 81.75 | 2.50 | |
| 75.92 | 2.48 | 73.90 |
| 71.87 | 2.47 | 70.90 |
| 67.79 | 2.45 | 66.30 |
| 63.74 | 2.42 | 61.59 |
| 59.29 | 2.40 | 58.38 |
| 55.24 | 2.37 | 53.46 |
| 50.83 | 2.35 | 50.12 |

From the actual values an equation can be developed representing an approximate fit for the actual values versus calculated values. This equation is $$V_c = 446.54 - (931.60/E) \quad (4)$$

where $V_c$ is the calculated volume and E is the voltage readout. This relationship can, of course, be established for other systems as well.

Turning now to the drawing, the numeral 10 generally indicates a sealed enclosure defining a chamber 11 which includes a snorkel breathing device 12. Chamber 11 has an access door 13 by which a person can enter or leave the chamber.

It will be readily obvious that the breathing device can take other forms and all that is necessary is that the subject be accommodated without affecting the other measurement parameters of the chamber. The chamber 11 can be coupled by an orifice coupling to other atmospheres in a spacecraft to permit ambient pressure to be maintained in the enclosure, and, in this event, the orifice coupling should have a long time constant relative to a time period for pressure variations.

Chamber 11 has an extension 14 which defines a cylinder 15 opening into the chamber 11. A piston 16 is connected to a reciprocating mechanism 17, hereinafter sometimes referred to as a displacement device. The displacement device 17 provides an output signal representative of the change caused by movement of the piston. As the piston 16 reciprocates, it varies the volume of the gas in the chamber 11. In the chamber 11 is a pressure responsive sensing device 19 which detects pressure and produces an electrical output signal representative of the pressure within the chamber. The change in volume ($\Delta V$) is supplied to the computer 21 from the displacement device 17. The change is pressure ($\Delta P$) of the gas in chamber 11 is supplied to the computer 21 from the sensing device 19. The absolute pressure value ($P_a$) is supplied to the computer 21 by a pressure sensing device 18. The volume of gas $V_g$ within the chamber 11 is determined from the computation of $\Delta P/\Delta V$ input together with the input absolute pressure ($P_a$) and an appropriate input value for $\gamma$.

From the determination of the volume of gas within chamber 11, the computer 21 subtracts the gas volume from the total volume of chamber 11 to provide the volume of the body. The volume of the body is recorded or stored together with a time value. While not illustrated, the entire sequence of operations may be manually or automatically controlled.

One of the significant aspects of the present invention is that the volume is determined from absolute pressure in the chamber, and no reference chamber is employed. As will be appreciated, the temperature in the chamber will not remain constant because of body heat. Nevertheless, with the use of absolute pressure and the change in pressure per change in volume, the volume of a human body and, hence, its density can be measured.

From the foregoing description it should be readily apparent that the present invention involves volume measurements and determinations which can be accomplished independent of gravity effects.

Further modifications and alternative embodiments will be apparent to those skilled in the art in view of this description, and, accordingly, the foregoing specification is considered to be illustrative only.

What is claimed is:

1. A method of ascertaining the volume of a human body wherein a respiratory subject is located within a chamber having a defined volume comprising the steps of
   cyclically changing at a rate of 1 to 100 Hz the volume of a chamber containing a respiratory subject;
   supplying a gas to said respiratory subject;
   while changing the volume of such chamber, measuring the pressure change in such chamber;
   measuring the absolute pressure in said chamber; and
   computing by machine operations the body volume of the respiratory subject by subtracting from the total volume of the enclosure the gas volume as determined from the equation $$(\Delta P/\Delta V) = (\gamma P_g/V_g)$$

where $\Delta P/\Delta V$ is the derivative change in pressure relative to volume, $\gamma$ is the ratio of specific heat at constant pressure to the specific heat at constant volume, Pg is the absolute pressure of the gas, and Vg is the volume of the gas.

2. The method as defined in claim 1 wherein the frequency of the changing of the volume is such that it has a short time period relative to the time period established for any leaks from the enclosure.

3. Apparatus for determining the volume of a human body comprising
   a substantially gas-tight enclosure containing a gas;
   means for supplying air to a subject within said enclosure;
   means for cyclically varying at a rate of 1 to 100 Hz the volume of said enclosure and for deriving an indication of the relative volume of said enclosure;
   means for deriving indications of changes in pressure;
   means for deriving an indication of the absolute pressure within said enclosure;
   means responsive to the derivative change in indications of pressure relative to changes in volume of said enclosure, the ratio of specific heat at constant pressure to the specific heat at constant volume, and the ambient absolute pressure of the gas in said enclosure for deriving the volume of gas in said enclosure; and means responsive to the derived value for the volume of gas in said enclosure for determining the volume of a subject in said enclosure.

4. The apparatus of claim 3 wherein said means for varying the volume of said enclosure includes a piston and cylinder system and said pressure deriving means comprises a low frequency response device.

5. The apparatus of claim 4 wherein said gas volume deriving means operates according to the relationship of $$(\Delta P/\Delta V) = (\gamma P/V)$$

where $\Delta P/\Delta V$ is the derivative change in indications of pressure relative to volume in said enclosure, $\gamma$ is the ratio of specific heat at constant pressure to the specific heat at constant volume, P is the ambient absolute pressure of the gas in said enclosure, and V is the gas volume in said enclosure.

* * * * *